United States Patent [19]
Uekusa

[11] Patent Number: 5,867,637
[45] Date of Patent: *Feb. 2, 1999

[54] DOCUMENT PROCESSING WITH FLEXIBLE RESOLUTION AND OUTPUT STYLE

[75] Inventor: Akihiko Uekusa, Funabashi, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 334,000

[22] Filed: Nov. 2, 1994

Related U.S. Application Data

[63] Continuation of Ser. No. 971,679, Nov. 4, 1992, abandoned, which is a continuation of Ser. No. 550,568, Jul. 10, 1990, abandoned.

[30] Foreign Application Priority Data

Jul. 13, 1989 [JP] Japan .................................. 1-182026

[51] Int. Cl.⁶ .................................................. G06K 15/00
[52] U.S. Cl. .......................................................... 395/112
[58] Field of Search ...................................... 395/700, 101, 395/112, 102, 114; 364/280, 280.4, 284

[56] References Cited

U.S. PATENT DOCUMENTS

| | | | |
|---|---|---|---|
| 4,648,047 | 3/1987 | Berkland et al. | 364/519 |
| 4,843,405 | 6/1989 | Morikawa et al. | 347/224 |
| 4,866,667 | 9/1989 | Shimada | 364/DIG. 2 |
| 4,885,717 | 12/1989 | Beck et al. | 364/DIG. 2 |
| 4,920,571 | 4/1990 | Abe et al. | 382/47 |
| 4,963,898 | 10/1990 | Kadowaki et al. | 346/157 |
| 4,991,114 | 2/1991 | Kawamura et al. | 364/159 |
| 5,010,513 | 4/1991 | Ueda | 364/900 |
| 5,031,115 | 7/1991 | Hayashi | 64/519 |
| 5,075,874 | 12/1991 | Steeves et al. | 395/112 |
| 5,168,292 | 12/1992 | Kadowaki et al. | 346/157 |
| 5,182,650 | 1/1993 | Inoue et al. | 358/296 |

Primary Examiner—Kevin A. Kriess
Attorney, Agent, or Firm—Fitzpatrick, Cella, Harper & Scinto

[57] ABSTRACT

There is provided a document processing system in which a print image is stored into a memory and can be handled as output data by forming a document. The system comprises: a memory to store document data in a bit map style; a converter for converting the document data including characters, figures, images, etc., based on the result of the document formation into data of bit map style to be stored into the memory; an image output device corresponding to a page description language; and a circuit for making the data of bit map style stored in the memory correspond to the data format of the page description language, suitably for the particular image output device. With this system, data of substantially the same style as that in the local printing characters can be obtained from an external printing system in accordance with a request of the user.

40 Claims, 7 Drawing Sheets

FIG. 1

| FUNCTION | GRAMMAR |
|---|---|
| CHR OUTPUT INSTRUCTION | PUTCHAR, POSITION OF CHR, NO OF CHRS, CHR CODE TRAIN |
| LINE DRAWING INSTRUCTION | LINE, INITIAL POINT, TERMINAL POINT, KIND OF LINE, WIDTH OF LINE |
| IMAGE FORMING INSTRUCTION | IMAGE, POSITION, WIDTH, HEIGHT, DATA TRAIN |
| FONT CHANGING INSTRUCTION | FONT, STYLE, CHR SIZE |
| ENDING INSTRUCTION | END |

- SHEET, 3000, 4000, A4  ----- SELECT SHEET SIZE A4 AND COORDINATES 3000 x 4000
- FONT, TIMES, 24  ----- SELECT TIMES 24 POINTS
- PUTCHAR, (500,600), 9, TEST DATA
  ----- WRITE 9 CHRS "TEST △ DATA" FROM POSITION (500, 600)
- LINE, (2100,1500), (1800,2800), 0, 4
  ----- DRAW A LINE WITH WIDTH 4 FROM (2100, 1500) TO (1800, 2800)
- LINE, (1800,2800), (2500,2700), 0, 4
- LINE, (2500,2700), (2100,1500), 0, 4
- IMAGE, (350,1500), 1000, 1700, 00000    0000
  ----- FORM AN IMAGE OF DATA TRAIN IN AREA WITH WIDTH 1000 AND HEIGHT 1700 FROM POSITION (350, 1500)
- END  ----- FINISH DATA RECEPTION AND PRINTING OUT

F I G. 4

```
· SHEET, 3000, 4000, A4
· IMAGE, (0, 0), 3000, 4000, 0000 ---- 0000
· END
```

| SHEET SIZE A4 |
| FIG. IND |
| NO OF FIGS. |
| 2100 (x) |
| 1500 (y) |
| 1800 (x) |
| 2800 (y) |
| ⋮ |
| CHR IND |
| FORMAT |
| NO OF CHRS |
| CHR CODE |
| ⋮ |
| IMAGE IND |
| IMAGE FILE NAME |

F I G. 8

· SHEET, 6000, 8000, A4
· IMAGE, (0,0), 6000, 8000, 0000 ---- 0000
· END

FIG. 9

DOCUMENT PROCESSING WITH FLEXIBLE RESOLUTION AND OUTPUT STYLE

This application is a continuation of application Ser. No. 07/971,679, filed Nov. 4, 1992, now abandoned, which was a continuation of application Ser. No. 07/550,568, filed Jul. 10, 1990, now abandoned.

BACKGROUND OF THE INVENTION

1. Field of the Invention

The present invention relates to a document processing system in which a print image is stored into a memory and can be handled as output data.

2. Related Background Art

In recent years, owing to the development of the techniques of image processing using a computer, a document can be formed, edited, and arranged by a computer, an image such as character data, figure data, image data, or the like included in the document is stored into a memory, and a printer output can be obtained from a bit image. Such a system has data of a specific image pattern (hereinafter, referred to as font data) of each character and its set width. A system called a WYS-WYG (What You See Is What You Get) which in editing can execute operations while displaying on a CRT the result of the same form (indicative of the electronic form in the present invention) as that upon printing, is main-stream. Upon printing, the font data is stored in the memory on the basis of the result of the form. On the other hand, a figure is drawn and image data is stored at a designated position on the basis of figure data (vector information). The image data is output by a printer which can execute a digital control based on the bit image in the memory.

The above system has font data, a form logic, an image memory printer, and the like in the system and can solely execute total document processes. In recent years, such a system is called a DTP (desk top publishing system) and has been highlighted.

However, the performance of the above DTP shown as a conventional example is inferior to that of a large-scale system having a computer-aided phototypographic composing machine or the like.

The following reasons are considered as causes.

First, there is a difference between resolutions of final outputs. The resolution of the DTP is set to about 400 dpi and that of the large-scale system is set to a value of 1200 to 2400 dpi or more. A bit image of 400 dpi of the A4 size requires 2 Mbytes even in the case where the bit image is constructed by binary data. To raise the resolution to 1200 dpi, 18 Mbytes, nine times as much as 2 Mbytes, are needed. Such a large capacity results in high costs of the memory and, as the quantity of data which is handled by the CPU used in the existing DTP, is a larger burden. In addition, local installation of such a printer is expensive.

Second, there is a difference between the kinds of font data. In the DTP, a few kinds, e.g., Ming-style type, Gothic type, and the like are provided. The large-scale system has a large number of various font data.

Therefore, the data which results from the form of the DTP is converted into data of the input form for the large-scale system and is output. On the large-scale system side, substantially the same form and style are derived, while an output of a high resolution is obtained by using a large number of various font data. However, it is difficult for the DTP to obtain substantially the same style as that of the result which was locally output because of differences between the form logics or between the font data. There is a drawback that editing or checking of work on the large-scale system side for the above adjustment is inevitable.

SUMMARY OF THE INVENTION

In consideration of the above points, it is an object of the present invention to provide a document processing system in which by providing a method whereby a bit image is stored into a memory on the DTP side in a manner similar to the case of the local printing and is converted into data for image data storage of an external printing system and is output to the external printing system, output of substantially the same style as that of the local print result on the DTP side can be obtained by the external printing system.

In consideration of the above points, another object of the invention is to provide a document processing system in which by providing a method whereby a bit image is converted into an image of the size which is larger than an actual size and is stored into a memory and is supported in a manner such that the bit image is converted into data for image storage of an external printing system and is output with the original size, output of a high resolution and substantially the same style as that of the local print result on the DTP side can be obtained by the external printing system.

In consideration of the above points, still another object of the invention is to provide a document processing system comprising: forming means for forming a document; converting means for converting the document data formed by the forming means, into data of bit map style; and controlling means for controlling whether the conversion by the converting means is executed in accordance with the size based on the document data or not in the case where the data of the bit map style which is converted by the converting means is made correspond to the data format of a page description language.

DETAILED DESCRIPTION OF THE PREFERRED EMBODIMENTS

An embodiment of the present invention will be described hereinbelow with reference to the drawings.

Figure 1:
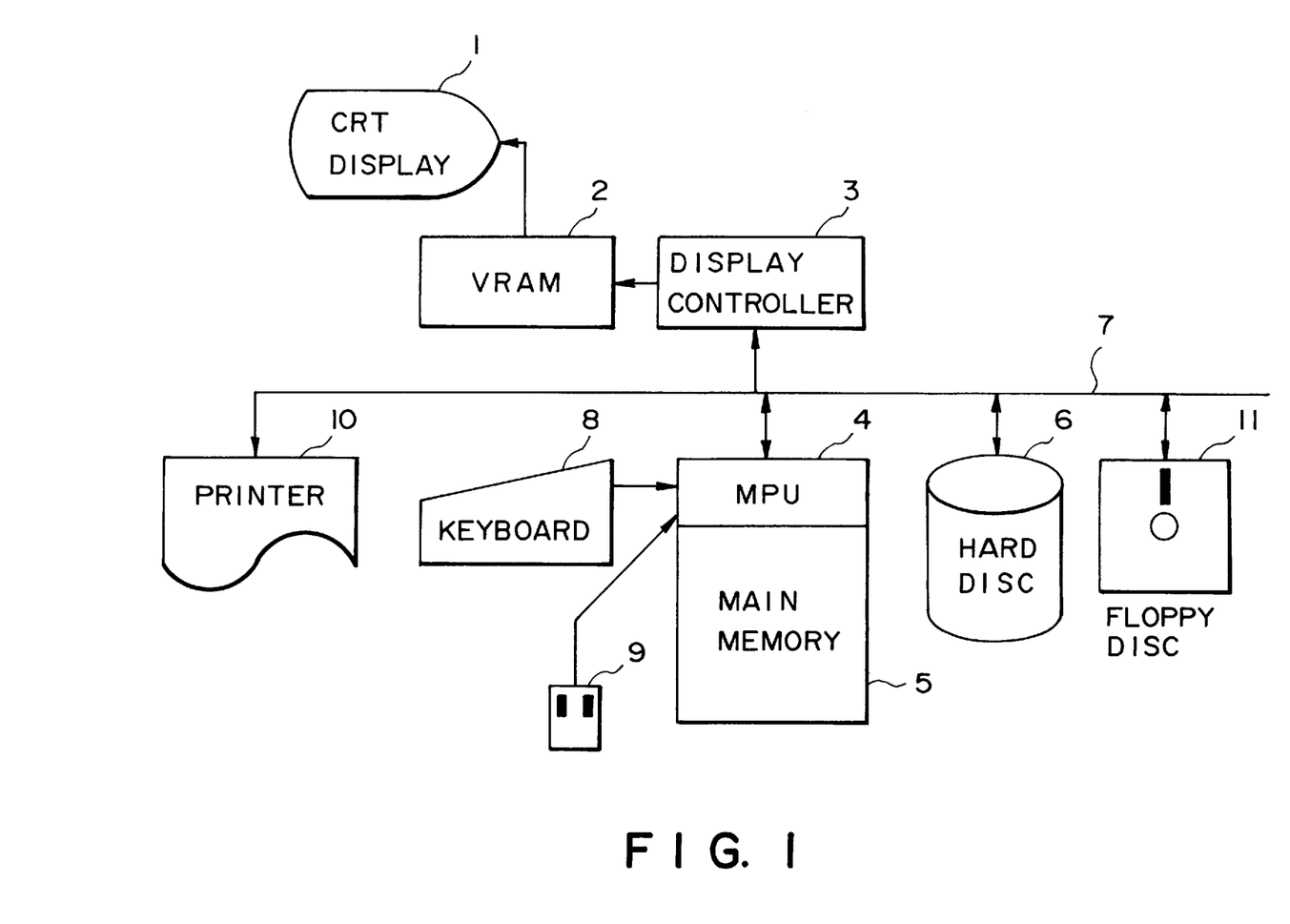
FIG. 1 is a block diagram of a document processing system according to an embodiment of the invention.

FIG. 1 is a block diagram of a document processing system in an embodiment according to the invention. The system in the invention may be constructed by a plurality of apparatuses or can be constructed by a plurality of systems each comprising a plurality of apparatuses. Or, the system may be constructed by a single apparatus. The system of the invention also incorporates the case of implementation by supplying a program to a computer such as a personal computer or the like by using an FD or the like. The document in the invention can also include character data, figure data, image data, form data, and the like.

In the diagram, reference numeral 1 denotes a CRT display which is used on the basis of the raster scanning type; 2 indicates a video RAM (VRAM) to store display pattern information of one picture plane; 3 a display controller to control the writing operation of the pattern information into the VRAM 2 and the reading operation to the CRT; 5 a main memory having areas to store control programs and document data; and 4 a micro-processor (MPU) to execute main control of the system. A keyboard 8 to execute an inputting operation of character data and the like and other processes and a pointing device 9 for performing the designation of a position on the CRT and the like and executing an inputting editing process on figure data and the like, are connected to the MPU 4. Reference numeral 6 denotes a hard disc into which document files and character fonts are stored; 10 indicates a printer to output the document formed; and 11 a floppy disc to execute the storage and the like of document files or the like. Each of the above blocks is connected by an I/O bus.

A document processing application program is constructed in the system and various document processing functions are provided. The above blocks are called DTP machines and have been described in detail in Japanese Patent Application No. 62-289142 (laid open as kokai 1-30256) and the like. In the above system, in the case of obtaining a local output by using the printer 10, the font data, figure data, image data, and the like are stored as a bit image into the main memory 5 and the data in the main memory is output to the printer. The printer 10 prints for each point in the image either a black dot or a blank dot onto the paper surface in accordance with whether a bit image of "1" or "0" is output from the main memory and outputs an image.

Figure 2:
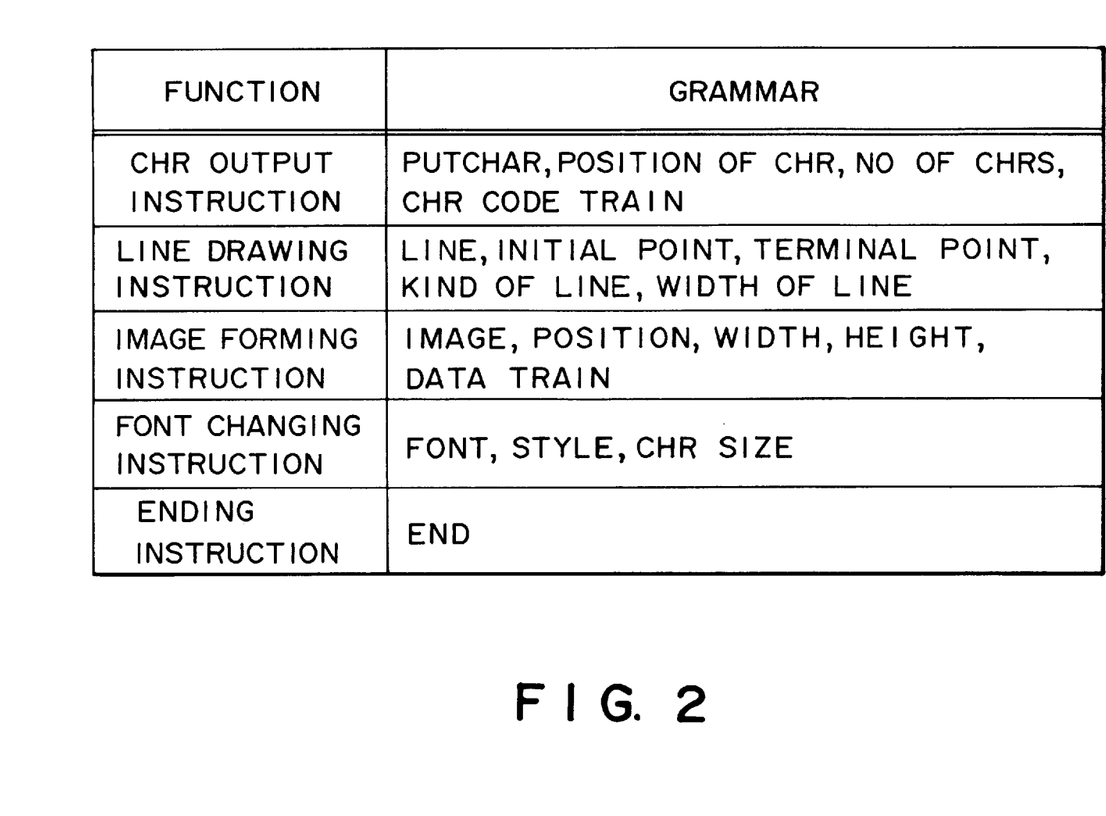
FIG. 2 is a data format of an external printing system.

In the case of outputting the same document to an external printing system, processes are executed in the following manner. The "external printing system" is an output apparatus for a phototypographic composing machine of high resolution or the like. For instance, such apparatuses are commercially available under trade names such as "Varityper", "Compugraphic", "Linotype", and the like. Those apparatuses correspond to, for example, a page description language (hereinafter "P D L ") such as a PostScript or the like. Another output apparatus such as the PC-PR602PS (made by Nippon Electronic Co., Ltd.) or the like can be also used. It is now assumed that the system has a data input format as shown in FIG. 2. Although the actual system receives a greater number of commands, it is assumed that the system has the data format as shown in FIG. 2 for simplicity of explanation.

Figure 3:
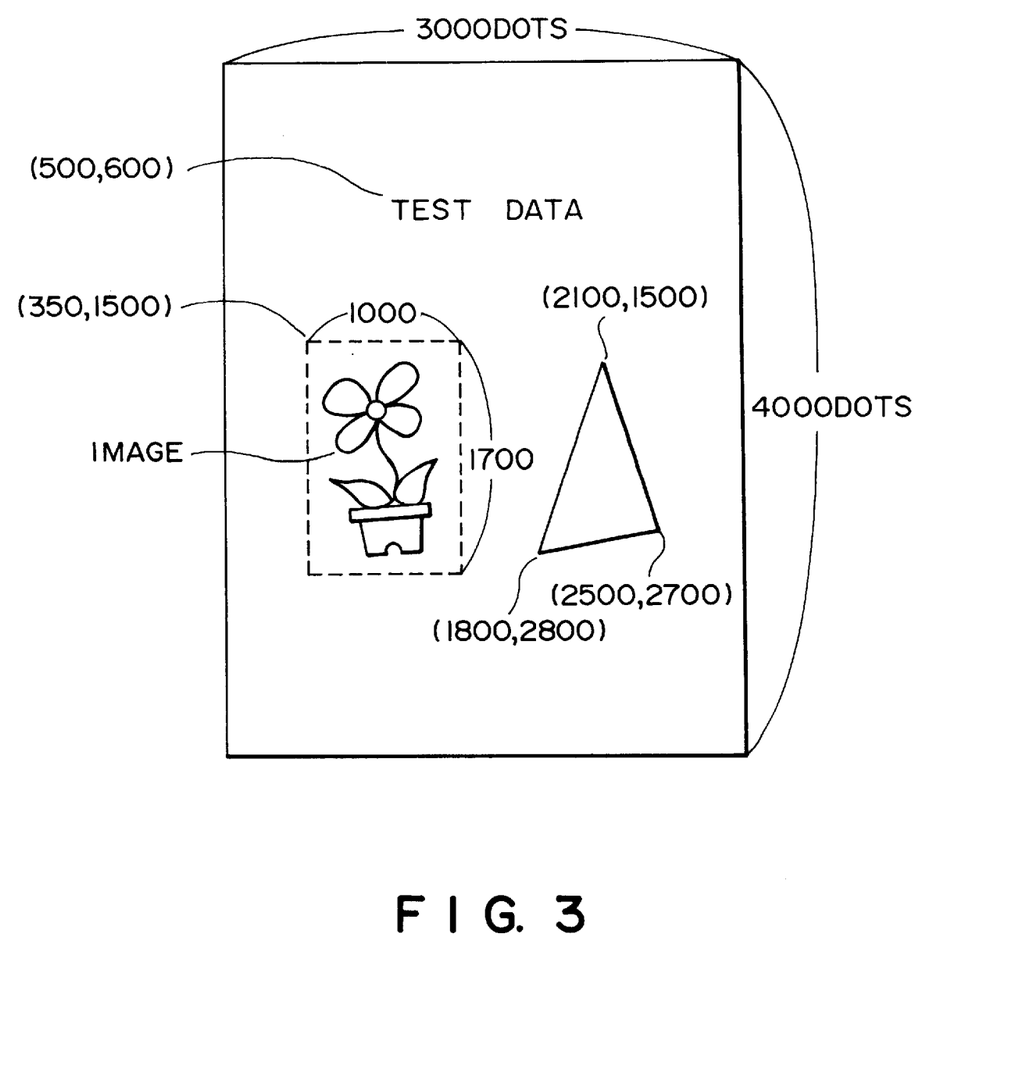
FIG. 3 is a diagram showing a sample document.
Figure 4:
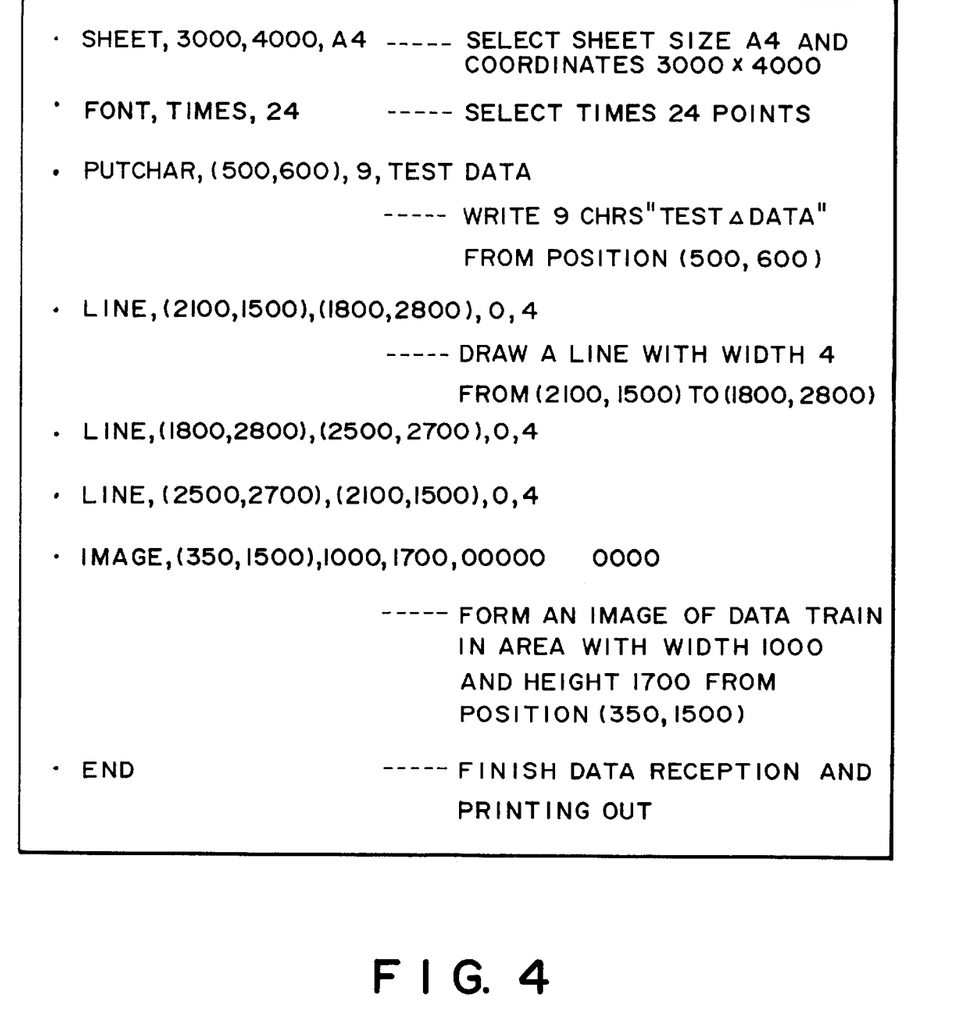
FIG. 4 is a diagram showing an example of output data output to the external printing system according to the first method.
Figure 7:
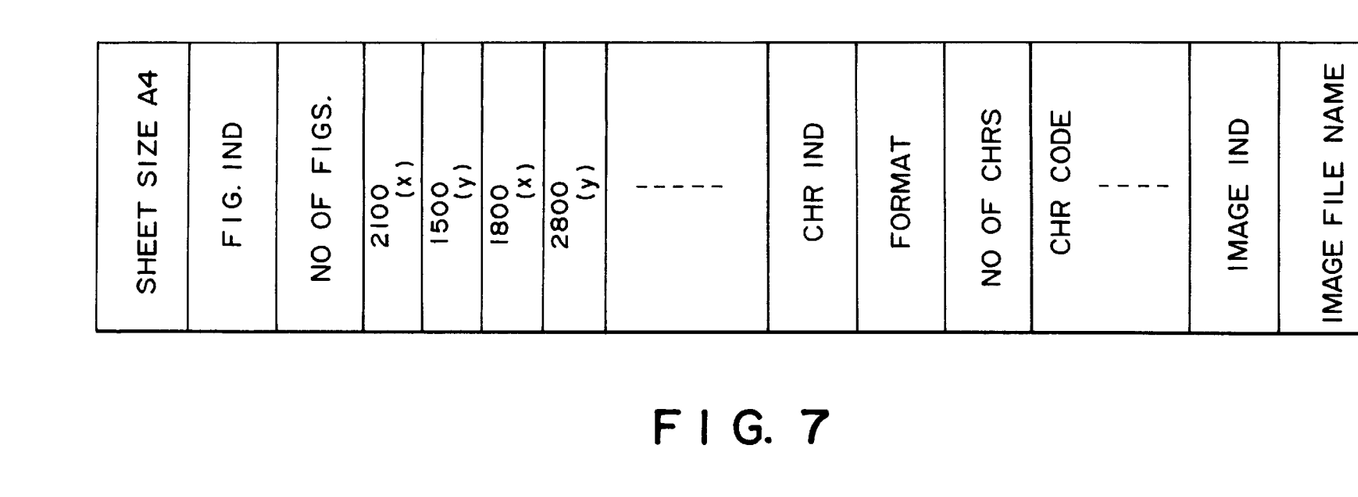
FIG. 7 is a diagram showing a document data format which the document processing system inherently has.

To allow the external printing system to output document data as shown in FIG. 3 in accordance with the data format shown in FIG. 2, it is sufficient to transmit data shown in FIG. 4. FIG. 7 shows a format of the document data which the document processing system inherently has. The document data is converted into the data shown in FIG. 4. It is sufficient to execute such a conversion by using, for instance, a table stored in the main memory 5 or hard disc 6. In FIG. 7, size data (for instance, "A4") and kind data (for example, "figure") are first stored. In the case of a figure, data indicative of the number of figures and coordinate dot train data are stored. In the case of a character, form data, character number data, and character code are stored. In the case of an image, name data of an image file stored in the hard disc 6 and the like are stored in, e.g., the main memory 5 as document data corresponding to one page. File size and the like are obviously stored in the image file. The figure data is converted into line data (2100, 1500), . . . shown in FIG. 4 or the like by using the above table.

It is now assumed that the external printing system can receive the data of FIG. 4 by an ASCII code. The data can be transmitted through a floppy disc or by a communication using a communication interface such as RS232C, Sentro, or the like.

Due to this, the external printing system can output the data of FIG. 3 with the resolution of the external printing system. However, when considering the character output portion, although the same TIMES FORM is used as a form, since the data is output by the font data of the external printing system, those forms are not always the same form. Although there is a case where the style changes, the above method is suitable in the case of obtaining data of a high resolution. On the other hand, in the case where external character data which was originally designed by the DTP is included in a character train, such external character data cannot be output.

The DTP has the following second output method different from the first output method to the external printing system as mentioned above. The user can select either one of the first and second output methods.

Figure 5:
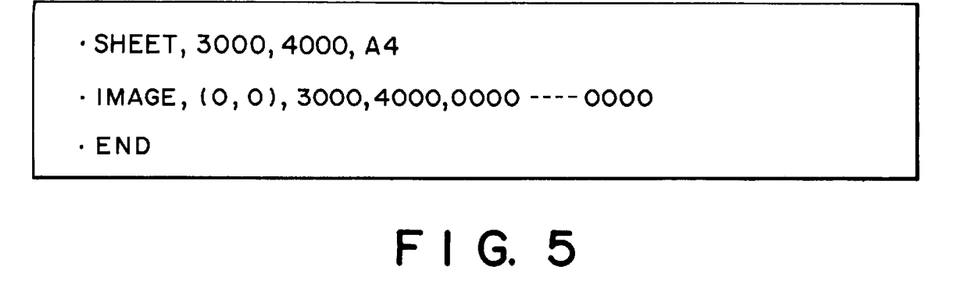
FIG. 5 is a diagram showing an example of output data output to the external printing system by the second method.

That is, the document data of FIG. 3 is stored into the main memory 5 in a manner similar to the case of once outputting data to the system's own printer. The whole document is handled as an image by using the bit image and data of FIG. 5 is output. In this case, since the bit image stored by using the font, external characters, etc. on the DTP side is sent, the output of substantially the same style is also obtained by the external printing system. In FIG. 5 (in the case of equal-magnification output), the "sheet" data designates that the size to be output is set to A4. Therefore, the image shown in FIG. 3 is output as the image data of the A4 size by executing the correction of the dot level on the basis of the difference of the resolution (for instance, between 400 dpi and 1200 dpi, between 400dpi and 320 dpi, etc.). For instance, one dot is converted into 3×3 dots or the process opposite to the above process or the like is executed.

[Flowchart]

Figure 6:
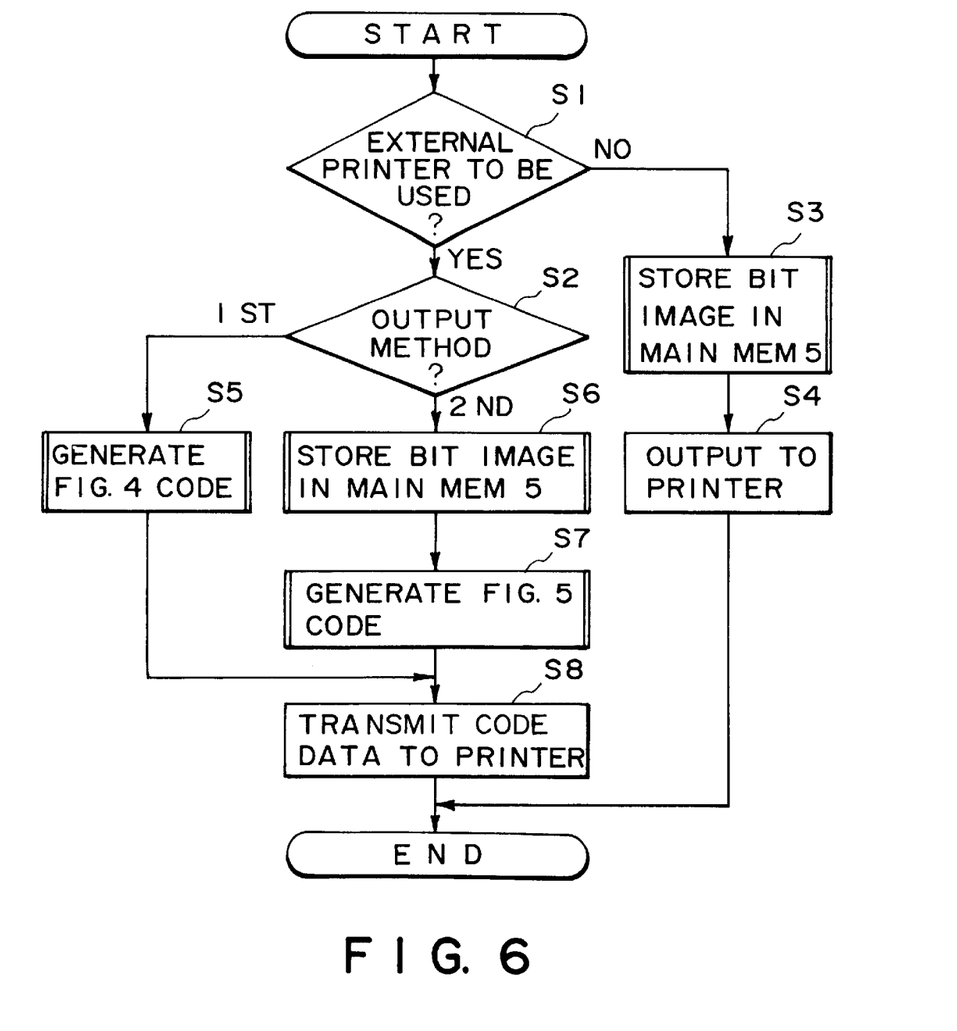
FIG. 6 is a processing flowchart.

The outputting operation by the MPU 4 based on the program stored in the main memory 5 in FIG. 1 will now be described with reference to FIG. 6. First, the user of the document processing system indicates an icon which is displayed on the CRT display 1 by using a pointing device 9, thereby making it possible to instruct the apparatus as to whether the external printing system is used or not (S1 in FIG. 6), and as to whether the method 1 is used or the method 2 is used, in the case of using the external printing system (S2 in FIG. 6).

In step S1, if it is determined that the external printing system is not used, step S3 follows and the bit map data corresponding to the document data is stored into the main memory 5 and is output to the printer 10.

On the other hand, if it is determined that the external printing system is used (S1) and the data is output by using the output method 1 (S2), the processing routine advances to step S5 and the data shown in FIG. 7 is converted into the data of FIG. 4 in a manner as mentioned above. On the other hand, if it is determined that the data is output by using the second output method, the bit image to be output is stored into the main memory 5 (S6). A code corresponding to the page describing language shown in FIG. 5 is generated (S7) and the code data from step S5 or S7 is transmitted to the external printing system in step S8, so that the outputting processes can be accomplished.

As described above, there is an effect that quite the same style as that in the case of the local printing mode can be obtained from the external printing system in accordance with the request of the user by constructing the system in such manner that there is provided means for storing the print image of a document including, for instance, characters, figures, images, and the like in the case of outputting data to the printing system and for converting the print image into the image of the input method of the image data of the printing system as if the whole image was image data as output data and for outputting and that such means can be selected in the case of outputting data to the printing system.

Or, according to the invention, by directly making the document data correspond to the PDL regarding the output apparatus, the document data can be easily output to the external output apparatus connected to the document processing system.

[Another embodiment, for the case of the second method and the variable magnification output]

Figure 8:
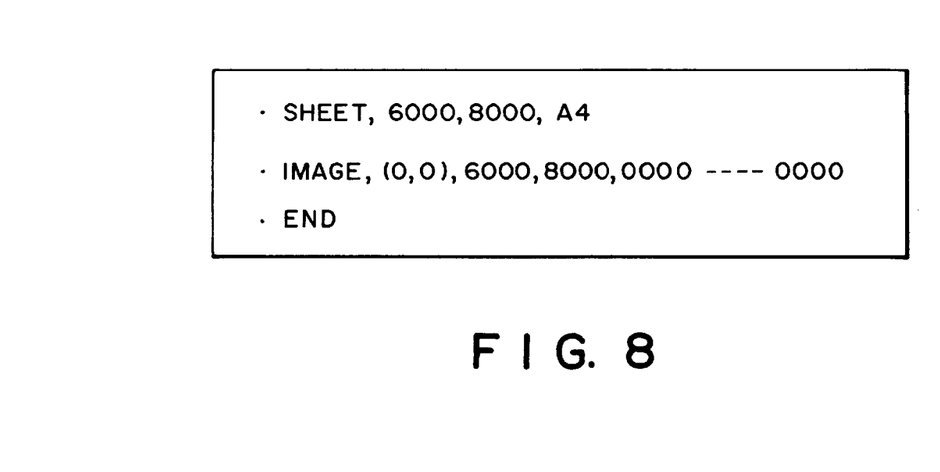
FIG. 8 is a diagram showing data in the case of executing a variable magnification output by the second method.

On the other hand, in the case where the resolution of the external printing system is higher than the resolution of the self system by, for instance, two or three times, when the bit image is stored into the main memory 5, by converting the bit image into an image which is two or three times as large as the original image and storing, an output of a the higher resolution can be obtained. That is, even if the image stored in the main memory 5 as mentioned above is output by the external printing system of a high resolution with the equal magnification size, the logical resolution is unchanged and is equal to 400 dpi. However, for instance, after all of the coordinate values, line width, character size, and the like shown in FIG. 3 were doubled and the image was stored, if it is output as the data of the A4 size as shown in FIG. 8, the output result whose resolution is logically twice as large as that of the data of the equal magnification size is obtained.

Figure 9:
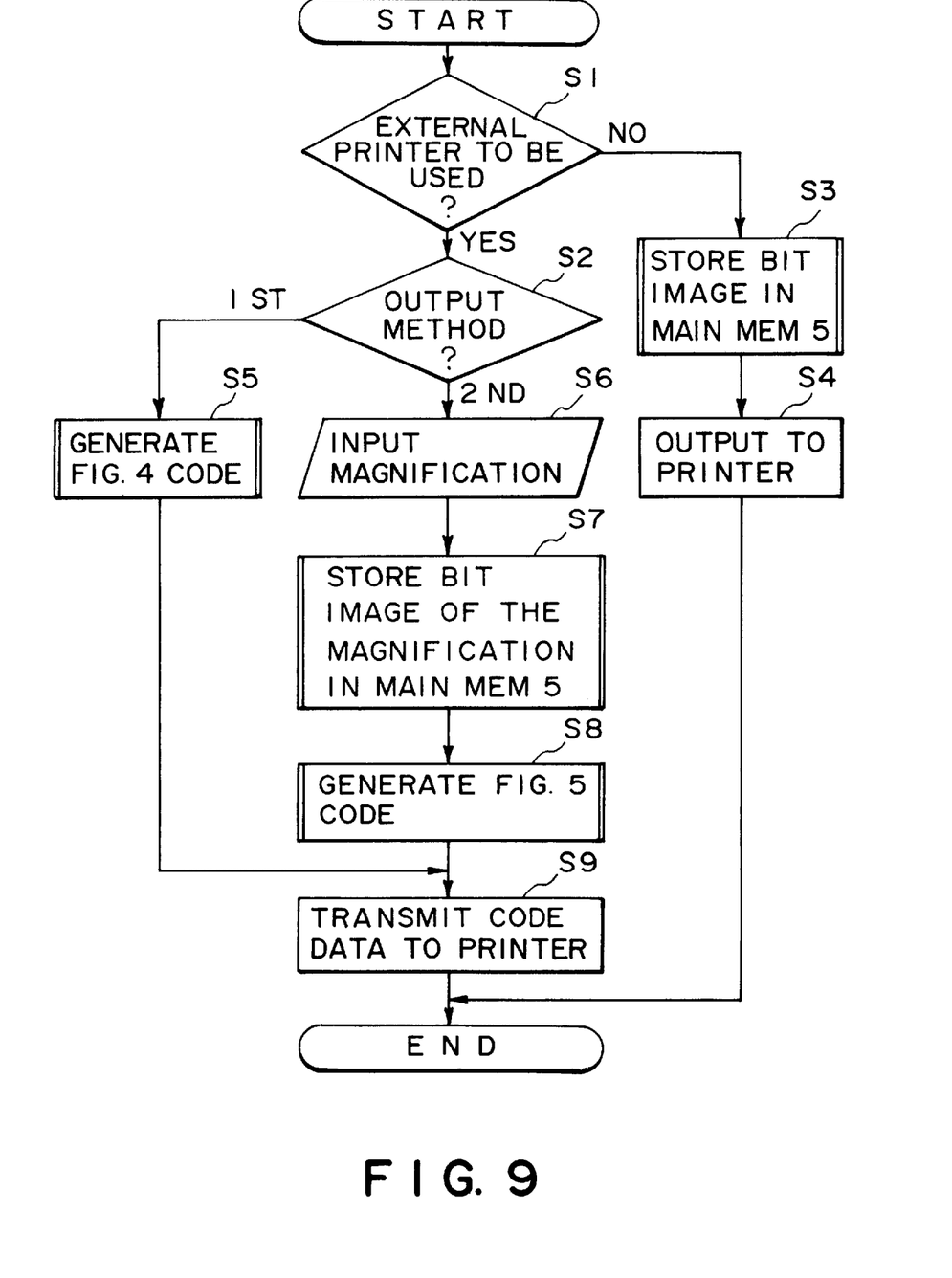
FIG. 9 is a flowchart showing the case of executing the output in accordance with the data shown in FIG. 8.

The outputting operation by the MPU 4 based on the program stored in the main memory 5 in FIG. 1 will now be described with reference to FIG. 9. First, the user of the document processing system indicates an icon displayed on the CRT display 1 by using the pointing device 9, so that he can instruct whether the external printing system is used or not (S1 in FIG. 9) and whether the method 1 or the method 2 is to be used (S2 in FIG. 9) in the case of using the external printing system.

In S1, if it is determined that the external printing system is not to be used, step S3 follows and the bit map data corresponding to the document data is stored into the main memory 5 and is output to the printer 10.

On the other hand, if it is determined that the external printing system is to be used (S1) and the data is to be output by the output method 1 (S2), step S5 follows and the data shown in FIG. 7 is converted into the data of FIG. 4 as mentioned above. If it is decided that the data is to be output by the second output method, step S6 follows and the storage magnification of the bit image into the main memory is input. The discriminating process in step S2 can be also executed in accordance with the residual amount in the main memory 5 in FIG. 1. The bit image is stored into the main memory 5 in accordance with the storage magnification (S7). For instance, in the case of equal magnification i.e., no change in size, a code corresponding to the PDL shown in FIG. 5 is generated and, for instance, in the case of the double magnification, a code corresponding to the PDL shown in FIG. 8 is generated (S8). The code data from step S5 or S8 is transmitted to the external printing system in step S9, so that the outputting processes can be accomplished.

As described above, there is an effect that a style which is substantially the same as that in the case of the local printing character can be obtained from the external printing system in accordance with a request of the user by providing means for storing a print image of a document including, for instance, characters, figures, images, and the like in the case of outputting data to the printing system and for converting the print image into the input style of the image data of the printing system and outputting as if the whole image were image data as output data and by enabling such means to be selected.

Or, according to the invention, by directly making the document data correspond to the page describing language regarding the output apparatus, the document data can be easily output to the external output apparatus connected to the document processing system.

Since it is possible to instruct the apparatus that the print image is to be enlarged and stored and converted into image of the image data input style of the printing system and the print image is output with the original size, the output of a high resolution and the same style can be obtained.

As described above, it is possible to provide a document processing system comprising: forming means for forming a document; converting means for converting the document data formed by the forming means into the data of the bit map style; and controlling means for controlling whether the conversion by the converting means is executed in accordance with the size based on the document data or not in the case of making the data of the bit map style which is converted by the converting means correspond to the data format of a PDL.

I claim:

1. An information processing apparatus which transfers print data to a printer, said apparatus comprising:

determining means for determining whether the print data is to be transferred to the printer in a first mode or in a second mode; and control means for causing said information processing apparatus to convert the print data into bit map data and to transfer the converted bit map data to the printer when said determining means determines that the print data is to be transferred in the first mode, and to convert the print data into print data which can be interpreted by the printer and to transfer the converted data to the printer when said determining means determines that the print data is to be transferred in the second mode, wherein the converted data in the second mode includes information indicative of a data type.

2. An apparatus according to claim 1, wherein the print data comprises a character code and a control code written in a page description language.

3. An apparatus according to claim 1, wherein the printer prints the bit map data transferred by said apparatus.

4. An apparatus according to claim 1, wherein the printer interprets the print data transferred by said apparatus, converts the interpreted data into bit map data, and prints the converted bit map data.

5. An apparatus according to claim 1, further comprising means for setting the first or the second mode.

6. An information processing apparatus which transfers print data to a printer, said apparatus comprising:

determining means for determining whether the print data is to be transferred to the printer in a first mode or in a second mode;

first conversion means for converting the print data into bit map data;

second conversion means for converting the print data into print data which can be interpreted by the printer, wherein the data resulting from the second conversion means includes information indicative of a data type; and control means for causing said information processing apparatus (1) to control either said first conversion means or said second conversion means to convert the print data in response to a determination made by said determining means and (2) to transfer the converted bit map data or the converted print data.

7. An apparatus according to claim 6, wherein the print data comprises a character code and a control code written in a page description language.

8. An apparatus according to claim 6, wherein the printer prints the bit map data transferred by said apparatus.

9. An apparatus according to claim 6, wherein the printer interprets the print data transferred by said apparatus, converts the interpreted data into bit map data, and prints the converted bit map data.

10. An apparatus according to claim 6, further comprising means for setting the first or the second mode.

11. A computer-executed method of processing information carrier out in an information processing apparatus which transfers print data to a printer, said method comprising the steps of:

determining whether the print data is to be transferred to the printer in a first mode or in a second mode; and converting the print data into bit map data and transferring the converted bit map data to the printer when said determining step determines that the print data is to be transferred in the first mode, and converting the print data into print data which can be interpreted by the printer and transferring the converted data to the printer when said determining step determines that the print data is to be transferred in the second mode, wherein the converted data in the second mode includes information indicative of a data type.

12. A method according to claim 11, wherein the print data comprises a character code and a control code written in a page description language.

13. A method according to claim 11, further comprising the step of controlling the printer to print the bit map data transferred in said converting and transferring step.

14. A method according to claim 11, further comprising the step of controlling the printer to interpret the print data transferred in said converting and transferring step, convert the interpreted data into bit map data, and print the converted bit map data.

15. A method according to claim 11, further comprising the step of setting the first or the second mode.

16. A computer-executed method of processing information carrier out in an information processing apparatus which transfers print data to a printer, said method comprising the steps of:

determining whether the print data is to be transferred to the printer in a first mode or in a second mode;

converting the print data using either a first conversion process for converting the print data into bit map data or a second conversion process for converting the print data into print data which can be interpreted by the printer in response to a determination made in said determining step, wherein the data resulting from the second conversion process includes information indicative of a data type; and transferring the converted bit map data or the converted print data to the printer.

17. A method according to claim 16, wherein the print data comprises a character code and a control code written in a page description language.

18. A method according to claim 16, further comprising the step of controlling the printer to print the bit map data transferred in said transferring step.

19. A method according to claim 16, further comprising the step of controlling the printer to interpret the print data transferred in said transferring step, convert the interpreted data into bit map data, and print the converted bit map data.

20. A method according to claim 16, further comprising the step of setting the first or the second mode.

21. A memory medium storing a program which, when loaded into and executed by a programmable apparatus, causes the apparatus to perform a method of processing information carrier out in an information processing apparatus which transfers print data to a printer, said method comprising the steps of:

determining whether the print data is to be transferred to the printer in a first mode or in a second mode; and converting the print data into bit map data and transferring the converted bit map data to the printer when said determining step determines that the print data is to be transferred in the first mode, and converting the print data into print data which can be interpreted by the printer and transferring the converted data to the printer when said determining step determines that the print data is to be transferred in the second mode, wherein the converted data in the second mode includes information indicative of a data type.

22. A memory medium according to claim 21, wherein the print data comprises a character code and a control code written in a page description language.

23. A memory medium according to claim 21, wherein the memory further comprises the step of controlling the printer to print the bit map data transferred in said converting and transferring step.

24. A memory medium according to claim 21, wherein the method further comprises the step of controlling the printer to interpret the print data transferred in said converting and transferring step, convert the interpreted data into bit map data, and print the converted bit map data.

25. A memory medium according to claim 21, wherein the method further comprises the step of setting the first or the second mode.

26. A memory medium storing a program which, when loaded into and executed by a programmable apparatus, causes the apparatus to perform a method of processing information carried out in an information processing apparatus which transfers print data to a printer, said method comprising the steps of:

determining whether the print data is to be transferred to the printer in a first mode or in a second mode;

converting the print data using either a first conversion process for converting the print data into bit map data or a second conversion process for converting the print data into print data which can be interpreted by the printer in response to a determination made in said determining step, wherein the data resulting from the second conversion process includes information indicative of a data type; and transferring the converted bit map data or the converted print data to the printer.

27. A memory medium according to claim 26, wherein the print data comprises a character code and a control code written in a page description language.

28. A memory medium according to claim 26, wherein the method further comprises the step of controlling the printer to print the bit map data transferred in said transferring step.

29. A memory medium according to claim 26, wherein the method further comprises the step of controlling the printer to interpret the print data transferred in said transferring step, convert the interpreted data into bit map data, and print the converted bit map data.

30. A memory medium according to claim 26, wherein the method further comprises the step of setting the first or the second mode.

31. A program product which, when loaded into and executed by a programmable apparatus, causes the apparatus to perform a method of processing information carrier out in an information processing apparatus which transfers print data to a printer, said method comprising the steps of:

determining whether the print data is to be transferred to the printer in a first mode or in a second mode; and converting the print data into bit map data and transferring the converted bit map data to the printer when said determining step determines that the print data is to be transferred in the first mode, and converting the print data into print data which can be interpreted by the printer and transferring the converted data to the printer when said determining step determines that the print data is to be transferred in the second mode, wherein the converted data in the second mode includes information indicative of a data type.

32. A program product according to claim 31, wherein the print data comprises a character code and a control code written in a page description language.

33. A program product according to claim 31, wherein the memory further comprises the step of controlling the printer to print the bit map data transferred in said converting and transferring step.

34. A program product according to claim 31, wherein the method further comprises the step of controlling the printer to interpret the print data transferred in said converting and transferring step, convert the interpreted data into bit map data, and print the converted bit map data.

35. A program product according to claim 31, wherein the method further comprises the step of setting the first or the second mode.

36. A program product which, when loaded into and executed by a programmable apparatus, causes the apparatus to perform a method of processing information carried out in an information processing apparatus which transfers print data to a printer, said method comprising the steps of:

determining whether the print data is to be transferred to the printer in a first mode or in a second mode;

converting the print data using either a first conversion process for converting the print data into bit map data or a second conversion process for converting the print data into print data which can be interpreted by the printer in response to a determination made in said determining step, wherein the data resulting from the second conversion process includes information indicative of a data type; and transferring the converted bit map data or the converted print data to the printer.

37. A program product according to claim 36, wherein the print data comprises a character code and a control code written in a page description language.

38. A program product according to claim 36, wherein the method further comprises the step of controlling the printer to print the bit map data transferred in said transferring step.

39. A program product according to claim 36, wherein the method further comprises the step of controlling the printer to interpret the print data transferred in said transferring step, convert the interpreted data into bit map data, and print the converted bit map data.

40. A program product according to claim 36, wherein the method further comprises the step of setting the first or the second mode.

* * * * *

UNITED STATES PATENT AND TRADEMARK OFFICE
CERTIFICATE OF CORRECTION

PATENT NO. : 5,867,637

DATED : February 2, 1999

INVENTOR(S): AKIHIRO UEKUSA

It is certified that error appears in the above-identified patent and that said Letters Patent is hereby corrected as shown below:

ON COVER PAGE AT [57], ABSTRACT

Line 11, "suitably" should read --suitable--.

COLUMN 3

Line 2, "by" should read --of--.

COLUMN 5

Line 30, "a" should be deleted.

COLUMN 7

Line 25, "carrier" should read --carried--.

COLUMN 8

Line 17, "carrier" should read --carried--.

UNITED STATES PATENT AND TRADEMARK OFFICE
CERTIFICATE OF CORRECTION

PATENT NO. : 5,867,637

DATED : February 2, 1999

INVENTOR(S): AKIHIRO UEKUSA

COLUMN 9

Line 14, "carrier" should read --carried--.

Signed and Sealed this

Twenty-third Day of November, 1999

Attest:

Q. TODD DICKINSON

*Attesting Officer*    *Acting Commissioner of Patents and Trademarks*